Feb. 15, 1938.          L. BURR          2,108,598
FISHING LINE
Filed Sept. 28, 1936
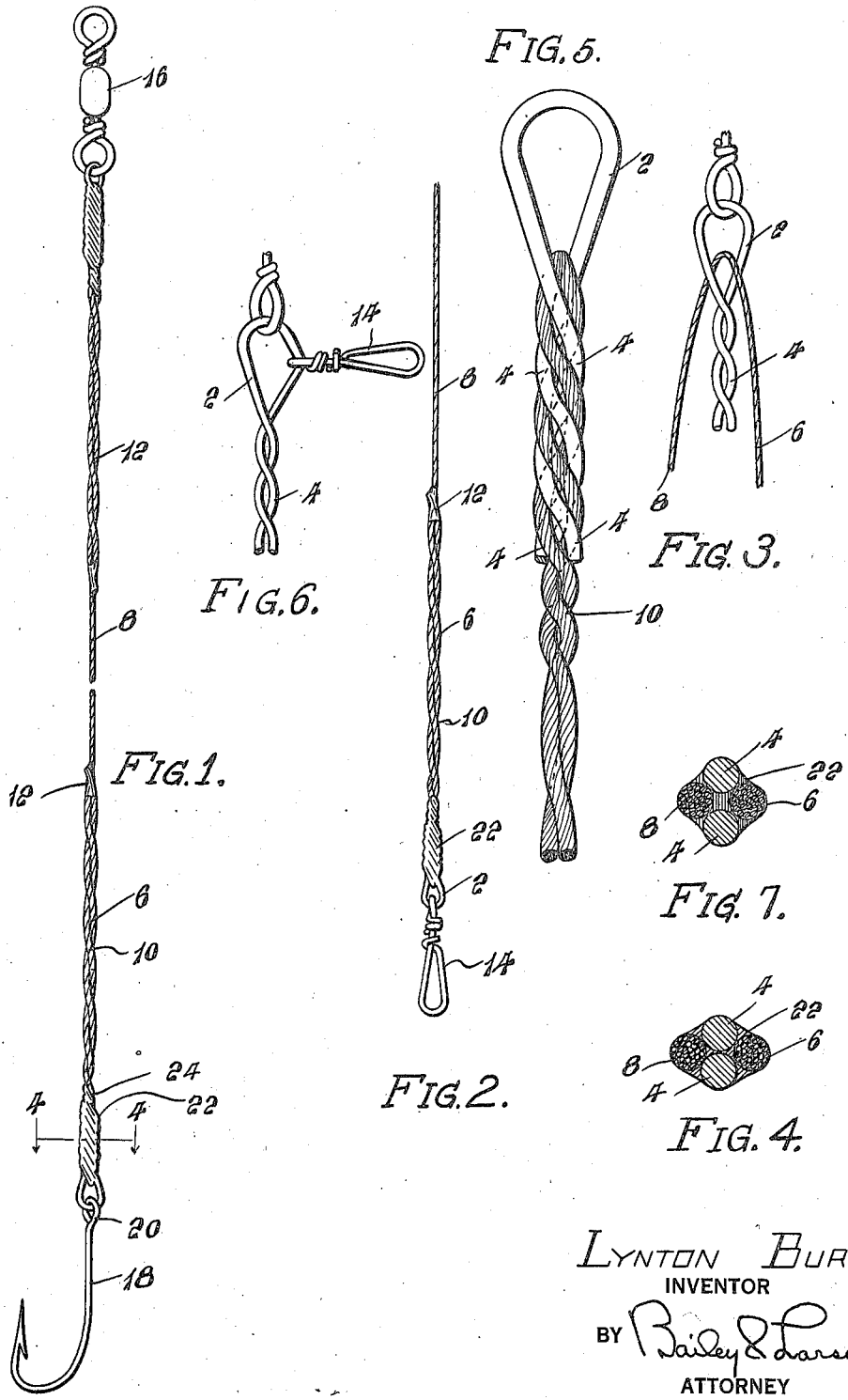
LYNTON BURR
INVENTOR Patented Feb. 15, 1938

2,108,598

UNITED STATES PATENT OFFICE 2,108,598

FISHING LINE

Lynton Burr, Hampton, Va.

Application September 28, 1936, Serial No. 103,016

17 Claims. (Cl. 43—28)

The present invention relates to improvements in joints or splices and more particularly to joints or splices at terminals of cables and it is particularly applicable to leaders and means for connecting the same to a fishhook, a swivel or the like.

It has ever been the aim of those who manufacture or employ draft or lifting equipment to reduce bulk and weight of lines and joints without simultaneously reducing tensile strength and wearing quality. This is particularly true in the case of such lines, joints and splices as are used in and about water and in fishing. The aim in the latter instance is to produce and/or employ that equipment which is such that it maintains known factors of strength over long periods of time and which at the same time has the characteristics of extreme flexibility, resistance to wear and corrosion, high strength per unit of bulk and consequent low visibility, simplicity, and consequent economy, and permits of loose but trustworthy coupling between elements such as leaders, loops, snaps, eyes, swivels, and the like. It is an object of this invention to produce a terminal and cable which has these and other qualities.

Heretofore, manufacturers have been able to test new equipment and to certify its strength in its condition as it leaves their hands and before use. Buyers and users depend upon this strength factor but they have always found it necessary to add a factor of safety to allow for consequent deterioration. But only slight deterioration has been found to make uncertain the strength of lines used in draft equipment and particularly in fishing leaders where the angler finds it necessary to apply fine degrees of tension to a line upon which he has hooked a fighting fish. It is, accordingly, an object of this invention to provide equipment which may be depended upon to retain a known standard over long periods of use.

Experience has proved that a standard, non-corrosive wire cable has the requisite qualities to make it suitable for a leader and is universally preferred where a metal leader is required. I have learned that the difficulty and weakness arose primarily because of the method of attaching such a leader to other elements such as the solid metallic eye or loop of a swivel, hook, snap, or the like. It has been customary to extend an end of the leader through the eye or loop, twist this end upon the body of the leader and then weld or solder the two together. An alternative method is to extend the end through the eye or loop thence back along the body of the leader without twisting and then weld or solder the two. Other methods are bulky and undesirable for this and other reasons. This method of welding or soldering leads to weaknesses which soon cause breaking points. The first of these occurs at the end of the solder joints away from the eye or loop. The solder extends over the adjacent strands of the joint making a solid inflexible section which consists of two strands of the woven wire and its covering of solder or weld flux. The solid section ends abruptly and a single strand of the woven wire extends therefrom. Lateral strains put upon the single strand of the flexible leader are carried to the point of emergence from the solid joint. The latter is too rigid to absorb any of the lateral strain and the full effect thereof is exhausted at this point. The material of which the leader is made soon fatigues and the crystalized metal breaks. It is an object of this invention to provide means to absorb the lateral strains and to overcome this weakness.

The second weak point is to be found at that point of prior assemblies where the loop of the leader is in contact with the eye of the fish hook, the loop of the swivel or other retaining element. This eye or loop is generally composed of a hard rigid metal against which the woven wire of the leader is strained and against which the leader wire rubs. Experience has taught that a pulling force applied on the leader and resisted at the retaining element or vice versa will cause a normally round stranded leader to flatten against the retaining eye or loop such that the individual strands of the woven leader become separated from each other. This separation, however, is sufficient to put a load upon the strands individually rather than in their stronger or closely interwoven positions. A further undesired effect of this flattening and separation results from the fact that the individual strands are each subject to wear from all sides. It will be manifest that where the leader is employed to hold or pull a periodically resisting load, the wear and flattening will be exaggerated in proportion. It is an object of this invention to eliminate all movable contacts between the stranded cable and the solid metal of the retaining element and to replace it with a contact of solid metal against equally solid metal.

Another disadvantage of the usual prior art construction resides in the difficulty of securing a stranded swivelled metal cable to fittings such as a hook, or similar fitting. Numerous devices have been suggested to accomplish this object which, however, either reduced the strength of the leader and its wearing qualities, or rendered the same too conspicuous under the water to be of practical value.

It is a further object of my invention to provide a leader such that a hook or other member with a wire eye may be easily attached or detached but without a spring snap. Snaps which work somewhat upon the same principle as a safety pin are usual. It is often the case, however, that a fish will swallow bait, hook and snap. The jaws and the grinders in the throat of the fish have been known to open the snap and permit escape of the fish. Woven wire leaders have been looped through eyes of fishhooks but not only did the hard eye of the hook quickly wear through the stranded cable but it was difficult to change the hooks. A pair of pliers used to spring the eye of the hook for release often cause injury to the comparatively fragile strands of the woven wire. The solid metal loop to which the woven wire of my leader is attached and which engages the eye of the hook will permit of use of pliers or other instruments without damage. In no case does stranded flexible wire have an opportunity to rub or wear against solid metal in my leader.

Other objects of the invention will appear from the following detailed description and the accompanying drawing in which:

Fig. 1 shows the new leader connected at the upper part to a swivel and at the lower part to a fishing hook.

Fig. 2 shows a snap link secured to a leader embodying my invention.

Fig. 3 shows one of the loop elements of the leader during the making thereof and before it is secured to the cable.

Fig. 4 is an enlarged cross section along the line 4—4 of Fig. 1.

Fig. 5 is an enlarged view of one terminal of the leader before being soldered or welded.

Fig. 6 is a modification showing a loop element with several link members attached thereto.

Fig. 7 is a section through a terminal made with larger materials.

Referring more particularly to these figures, the loop element 2, preferably consisting of solid wire of the same or similar material and degree of hardness as the element which is to be secured thereto, for example, of drawn brass, is formed with extensions 4 which are wound or twisted upon each other. One end portion 6 of a stranded wire or cable 8 of the leader is passed through the loop 2, and this end portion 6 and the cable 8 are first intertwisted with extensions 4 of the wire 2 and then are twisted upon each other for a certain distance as shown at 10 particularly in Fig. 5. The end portion 6 is then secured at its end 12 to the cable 8 by soldering, welding or any other suitable method or means. Finally, the cable 8, its end 6 and the extensions 4 of the loop portion 2 are further secured together by soldering 22, by welding or any other means while in the intertwisted relation.

As shown in Figs. 1, 2, and 6 by way of example, various elements or types of elements may be secured to the leader above described. In its particular application as a fishing tackle, a snap link 14, a swivel 16, a hook 18 or any other implement, or a plurality of such elements may be attached thereto. If several such elements should be secured to one loop 2, I preferably shape the same as shown in Fig. 6 or in a similar manner to maintain the several elements in separate position.

The swivel 16, Fig. 1, is of a well known type and forms no part of my invention. The use of such swivels is common in draft equipment and in fishing tackle. The connection of the leader to the swivel is the same as that used for connection to a snap or fishhook since wear occurred here as at the other end in prior assemblies. As shown in the lower part of Fig. 1, a steel hook 18 may be attached to loop 2 by its eye 20. In this instance, loop 2 is preferably made of stainless steel to avoid excessive wear between the two elements. The hook 18 may be removed easily by bending the free end of the eye laterally with respect to the shank of the hook thus opening the eye. The new hook is opened in the same way, the loop 2 is inserted into the open eye. The latter is then closed by reversal of the process of opening the eye. The loop of the prior art, corresponding to my stainless steel loop 2, was of relatively soft woven wire. When pliers were applied to open the eye for removal of an old hook, the stranded wire usually was mutilated and weakened. It is manifest that my invention overcomes this objection.

The snap link 14, Figs. 2 and 6, also is well known commercially and it will be manifest from attached claims that it forms no part of my invention. It is shown merely by way of example as one of the retaining elements to which the leader and loop 2 may be attached. This modification is best used where soft or weak jawed fish abound while the embodiment of Fig. 1 is best used in situations where a snap might be opened.

As I have already indicated, one of the important advantages of my construction resides in the possibility of connecting together two metallic elements having the same degree of hardness and the same wearing qualities. By this provision any excessive wear upon one of two or more interconnected elements is avoided and the life of the leader and the element connected thereto is increased in unexpected degree.

Another very important advantage resides in the new construction of the loop or eye 2. By making this loop of a separate element of solid wire, it is possible to choose the same type of material of which the element is formed which is to be connected to the loop. By intertwisting arms 4 of the loop grooves and the cable, it is possible to remove the loop from the cable by heating the soldering 22 and to pull the cable through the twisted arms 4 which will spring sufficiently to permit the cable to pass through. A worn loop or a loop of undesirable material can thus be easily removed and replaced by a new loop without the necessity of melting the soldering at 12 or of untwisting the arms 4 by simply springing open the twisted arms 4 of the new loop grooves, sliding the cable therebetween, intertwining the arms 4 and the cable and then applying solder 22.

By intertwining the arms 4 of the loop 2 with the cable not only is a secure connection formed, which is further insured by the soldering, welding, or other means 22 connecting the solid wires 2 with the cable wires but the thickness of the terminal is considerably reduced and consequently made much less conspicuous under water.

The relatively stiff arms of the loop 2 serve an additional purpose in that they reinforce the terminal. In the above discussion of the prior art it was stated that the prior terminals were so inflexible that they did not carry into the body thereof any part of the lateral strains on the leader. They were not of such degree of stiffness, however, that they could not be bent. I have found that they are bent by the angler every time he coils his leader to put it into his equipment box. It is usual in such case to make a coil of rather small diameter to conserve space. Thereby the terminal is bent. It must be straightened by hand when again used. This results in waste of time and fatigue of the metal as well as breaking away of the weld or solder material. It will be manifest that the intertwined bronze, stainless steel or other hard metal arms 4 of my loop 2 are so strong as to prevent this bending. The soldered section may, because of my novel construction, be so short that a small diameter coil may be made when the leader is to be put away.

I am not unmindful of the fact that I have said heretofore that my terminal has lateral strain absorbing qualities while I have said immediately above that it is stiff. It will be obvious from consideration of the following that I have not contradicted myself.

The extended portion 10 is to act as a shock absorber to relieve any angular strain to which the soldered portion 22 might be subjected by the jerking motions and by handling of a fighting fish. It is a well known fact that a soldered or welded cable terminal which is subjected to angular stresses has the tendency to break off shortly behind the soldered or welded portion. By doubling the strength of the cable at this danger point, by twisting the cable 8 and end 6 together and by extending portion 10 for a certain distance, any stresses tending to bend the soldered portion 22 relative to the cable proper are transmitted to and relieved by the shock absorbing portion 10. Likewise, the increased strength and resiliency of the shock absorbing portion 10 prevents sharp angular bending and subsequent breaking of the cable at point 24. Although I have shown a soldered connection at 12, the individual strands at this point may be intertwined with the strands of the cable or wrapper with fine wire or other means which will further avoid any danger of breakage at this point because of angular bending.

Although I have shown and described my invention as particularly applicable to a leader for fishing tackle, I do not wish to be restricted thereto since this is merely exemplary. The invention, and particularly the construction of the cable terminal or loop portion can be used for various other purposes by varying materials and sizes.

It should be obvious, for instance, that terminals made according to my invention may be used in logging operations where "snaking" cables are subjected to a multiplicity of shocks and strains. The towing of barges and boats and the lifting of materials on cranes also will afford a field in which my terminal is particularly adaptable. The terminal is also useful for ship rigging, auto tow lines, and similar lines. In applying my terminal to larger materials it is advisable to twist loosely the arms of loop 2 as shown in Fig. 7. This loose arrangement permits a body of solder or other molten material to flow into the center of the terminal and makes the terminal suited for very large loads. Of course, the arms of loop 2 may be twisted loosely for terminals of leaders if desired or if proper implements to make a tight twist are not at hand. It will be understood that the flexible part 10 is used also where larger materials are employed and where the cable is to be wound upon a drum as this portion 13 possesses sufficient flexibility to permit of winding upon small diameter drums.

I claim:

1. A terminal for a cable comprising a solid metal loop having arms twisted one upon the other, said cable passing through said loop and being twined together with said arms.

2. A terminal for stranded wire cable comprising a solid metal loop having arms intertwisted one with the other so as to form shallow spiral recesses over the contacting surfaces of said arms, said cable passing through said loop and being twisted into said recesses.

3. A terminal for stranded wire cable comprising a solid wire loop having arms extending therefrom, said arms being intertwisted one with the other so as to form shallow spiral recesses over the contacting surfaces of said arms, said cable passing through said loop and thereby forming two arms, said latter arms being twisted one upon the other and into said recesses.

4. A terminal for a stranded wire cable comprising a solid wire loop having arms extending therefrom, said arms being intertwisted one with the other, said cable passing through said loop thereby forming two arms, said last arms being twisted together with said first arms, and means for securing said first and last arms together.

5. A terminal for a stranded wire cable comprising a solid wire loop having arms extending therefrom, said arms being intertwisted one with the other, said cable passing through said loop thereby forming two arms, said last arms being twisted together with said first arms and being intertwisted beyond said first twisted arms, means for securing said first and last arms together, and means for retaining said cable arms in intertwisted relation beyond said first arms.

6. A terminal for a stranded wire cable comprising a solid wire loop having arms extending therefrom, said arms being intertwisted one with the other so as to form shallow spiral recesses over the contacting surfaces of said arms, said cable passing through said loop thereby forming two arms, said last arms being twisted into said spiral recesses, and being intertwisted beyond said first arms so as to form a shock absorbing portion, means for securing said first and last arms together and means for retaining said cable arms in intertwisted relation beyond said first arms.

7. A leader for fishing tackle comprising a flexible wire, one end of said wire being twisted upon itself, a part of said twisted end having the wires free to provide a flexible shock absorbing portion, and a closed loop of rigid metal secured to the end of said twisted portion.

8. A leader for fishing tackle comprising a flexible wire, one end of said wire being twisted upon itself to provide a shock absorbing portion, and a closed loop of rigid metal, the said loop having an extension overlapping with the end portion of said twisted portion and secured thereto along substantially the whole length of said overlapping portion.

9. A leader for fishing tackle comprising a stranded wire cable, a solid wire loop having arms extending therefrom, said arms being twisted one upon the other, said cable passing through said loop and being twined together with said arms.

10. A leader for fishing tackle comprising a stranded wire cable, a solid wire loop having arms extending therefrom, said arms being intertwisted one with the other so as to form shallow spiral recesses over the contacting surfaces of said arms, said cable passing through said loop and thereby forming two arms, said latter arms being twisted one upon the other and upon said first arms so as to fill said recesses.

11. A leader for fishing tackle comprising a stranded wire cable, a solid wire loop having arms extending therefrom, said arms being twisted one upon the other, said cable passing through said loop thereby forming two arms, said last arms being twisted together with said first arms, and means for securing said first and last arms together.

12. A leader for fishing tackle comprising a stranded wire cable, a solid wire loop having arms extending therefrom, said arms being twisted one upon the other, said cable passing through said loop thereby forming two arms, said last arms being twisted together with said first arms, an extension on one of said last arms, said extension being twisted together with said cable, means for securing said first and last arms together, and means for securing the end of said extension to said cable.

13. A leader for fishing tackle comprising a stranded wire cable, a solid wire loop having arms extending therefrom, said arms being intertwisted one with the other so as to form spiral recesses over the contacting surfaces of said arms, said cable passing through said loop thereby forming two arms, said last arms being twisted into said recesses, an extension on one of said last arms, said extension being twisted together with said cable so as to form a shock absorbing portion, means for securing said first and last arms together and means for securing the end of said extension to said cable.

14. A leader for fishing tackle comprising a wire of flexible metal having at its end a separate solid rigid metal loop, said wire and loop having portions secured rigidly together, said wire terminating short of the outer end of said loop.

15. A leader for fishing tackle comprising a flexible wire having a body portion and a flexible shock absorbing portion adjacent one end of less flexibility than said body portion, and securing means at such end comprising a rigid metal loop rigidly secured to said shock absorbing portion.

16. A leader for fishing tackle comprising a flexible wire and a closed loop of rigid metal secured to one end of the wire, said loop having arms twisted together so as to form grooves, said wire being twisted into said grooves.

17. A leader for fishing tackle comprising flexible wire, a closed loop of rigid metal secured to one end of the wire, and resilient connecting means secured to said loop.

LYNTON BURR.